(12) United States Patent
Takase (10) Patent No.: US 11,014,080 B2
(45) Date of Patent: May 25, 2021

(54) HONEYCOMB STRUCTURE

(71) Applicant: NGK INSULATORS, LTD., Nagoya (JP)

(72) Inventor: Naoya Takase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 387 days.

(21) Appl. No.: 15/914,069

(22) Filed: Mar. 7, 2018

(65) Prior Publication Data

US 2018/0264455 A1 Sep. 20, 2018

(30) Foreign Application Priority Data

Mar. 15, 2017 (JP) .............................. JP2017-050182

(51) Int. Cl.
*B01D 46/24* (2006.01)
*B01J 35/04* (2006.01)
(Continued)

(52) U.S. Cl.
CPC ............ *B01J 35/04* (2013.01); *F01N 3/2803* (2013.01); *B01D 53/94* (2013.01); *F01N 3/2006* (2013.01);
(Continued)

(58) Field of Classification Search
None
See application file for complete search history.

(56) References Cited

U.S. PATENT DOCUMENTS

| 5,063,029 | A | * | 11/1991 | Mizuno | ............... B01J 35/0033 219/552 |
| 5,651,088 | A | * | 7/1997 | Abe | ..................... F01N 3/2817 392/494 |

(Continued)

FOREIGN PATENT DOCUMENTS

| DE | 10 2012 109 391 A1 | 4/2014 |
| JP | H03-295184 A | 12/1991 |

(Continued)

OTHER PUBLICATIONS

German Office Action, German Application No. 10 2018 203 903.8, dated May 8, 2020 (4 pages).
(Continued)

*Primary Examiner* — Humera N. Sheikh
*Assistant Examiner* — Mary I Omori
(74) *Attorney, Agent, or Firm* — Burr & Brown, PLLC (57) ABSTRACT

A columnar honeycomb structure comprising an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged on the outer peripheral side wall, wherein the honeycomb structure satisfies a relationship of $H_1 > H_2$ in which: $H_1$ represents an average height of the entire honeycomb structure; and $H_2$ represents an average height of a portion of the honeycomb structure surrounded by a straight line $M_1$ parallel to a line segment M and located at a distance of $0.1 \times L_1$ from the line segment M toward a first direction and a straight line $M_2$ parallel to the line segment M and located at a distance of $0.1 \times L_2$ from the line segment M toward a second direction, wherein when viewing the honeycomb structure from its bottom, the line segment M represents a line segment connecting circumferential centers of the pair of terminal connection portions and extending from one outer peripheral side surface to the other outer peripheral side surface, and $L_1$ and $L_2$ represent length in the first direction and the second direction perpendicular to the line segment M from a middle point O of the line segment M to the outer peripheral side surface, respectively.

7 Claims, 6 Drawing Sheets

(51) Int. Cl.
  *F01N 3/28* (2006.01)
  *B01D 53/94* (2006.01)
  *F01N 3/20* (2006.01)

(52) U.S. Cl.
  CPC ...... *F01N 2330/30* (2013.01); *F01N 2330/48* (2013.01)

(56) References Cited

U.S. PATENT DOCUMENTS

2009/0136710 A1* 5/2009 Ichikawa ............ C04B 38/0009
                                                              428/117
2015/0267583 A1   9/2015 Brueck et al.
2016/0243724 A1*  8/2016 Kitaguchi ............. B28B 11/243

FOREIGN PATENT DOCUMENTS

JP   2010-229976 A1  10/2010
JP   2012-188958 A1  10/2012

OTHER PUBLICATIONS

Japanese Office Action (with English translation), Japanese Application No. 2017-050182, dated Aug. 4, 2020 (7 pages).

\* cited by examiner

Example 1

[FIG. 3]

Example 2

[FIG. 4]

Example 3

[FIG. 5]

Comparative Example 1

HONEYCOMB STRUCTURE

BACKGROUND OF THE INVENTION

1. Field of the Invention

The present invention relates to a honeycomb structure. More particularly, it relates to a honeycomb structure that is suitable for use in application of supporting a catalyst for exhaust gas purification and rapidly increasing a temperature to an activation temperature of the catalyst.

2. Description of Related Art

Conventionally, a catalyst supported on a honeycomb structure is used for purifying harmful substances such as HC, CO, and NOx contained in exhaust gas discharged from an engine of a motor vehicle or the like. Thus, when treating the exhaust gas with the catalyst supported on the honeycomb structure, a temperature of the catalyst should be increased to its activation temperature. However, there has been a problem that since the catalyst does not reach the activation temperature at starting of the engine, the exhaust gas is not sufficiently purified. In particular, a plug-in hybrid vehicle (PHEV) and a hybrid vehicle (HV) may run only with the motor for its traveling, so that engine starting frequency is less and the catalyst temperature at starting of the engine is low, thereby tending to deteriorate the exhaust gas purification performance immediately after the engine is started.

In order to solve the problem, an electric heating catalyst (EHC) has been proposed. The EHC is configured to be capable of heating the catalyst to the activation temperature before starting of the engine by connecting a pair of terminals to a columnar honeycomb structure made of conductive ceramics and causing the honeycomb structure itself to generate heat by applying electric current. In the EHC, it is desired to provide a uniform temperature distribution by reducing temperature variation in the honeycomb structure in order to obtain a sufficient catalytic effect.

Japanese Patent Application Laid-open Publication No. 2010-229976 A (Patent Document 1) proposes a honeycomb structure comprising electrode portions on both end surface sides, which have lower volume resistivity, and heating portions on the inner side, which have higher volume resistivity, in a honeycomb body for energization and heat generation, for the purpose of uniform heating of the honeycomb structure.

Japanese Patent Application Laid-open Publication No. 2012-188958 A (Patent Document 2) proposes to provide electrodes at opposing positions across a catalyst carrier, when viewed in the perpendicular cross section orthogonal to the flow direction of exhaust gas, in order to uniformly heat the catalyst carrier. Further, it proposes that the catalyst carrier is provided with a plurality of partition portions by partitioning the catalyst carrier in a direction orthogonal to the electrode central line, and these partition portions have different volume resistivity so that the amount of heat generated by energization becomes close to uniformity at each part of the catalyst carrier.

CITATION LIST

Patent Literatures

Patent Document 1: Japanese Patent Application Laid-open Publication No. 2010-229976 A Patent Document 2: Japanese Patent Application Laid-open Publication No. 2012-188958 A

SUMMARY OF THE INVENTION

Technical Problem

The arts described in Patent Documents 1 and 2 focus on changing the volume resistivity of the material forming the honeycomb structure depending on the positions for uniform heating. However, in order to change the materials, the parts should be separately produced and joined, so that deterioration of structural reliability such as breakage at the joint parts may be caused. Therefore, it would be advantageous if the uniform heating property of the honeycomb structure can be enhanced by a method different from that of joining the parts with different volume resistivity.

The present invention has been made in view of the above circumstances, and one of objects of the present invention is to provide a honeycomb structure having improved uniform heating property from a view point different from the conventional one.

Solution to Problem

As a result of intensive studies to solve the above problems, the present inventor has found that the uniform heating property is significantly enhanced by improving the bottom surface shape of the columnar honeycomb structure.

The present invention has been completed based on the above findings. In one aspect, the present invention provides:

a columnar honeycomb structure comprising an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged on the outer peripheral side wall, wherein the honeycomb structure satisfies a relationship of $H_1 > H_2$ in which:

$H_1$ represents an average height of the entire honeycomb structure; and $H_2$ represents an average height of a portion of the honeycomb structure surrounded by a straight line $M_1$ parallel to a line segment M and located at a distance of $0.1 \times L_1$ from the line segment M toward a first direction and a straight line $M_2$ parallel to the line segment M and located at a distance of $0.1 \times L_2$ from the line segment M toward a second direction, wherein when viewing the honeycomb structure from its bottom, the line segment M represents a line segment connecting circumferential centers of the pair of terminal connection portions and extending from one outer peripheral side surface to the other outer peripheral side surface, and $L_1$ and $L_2$ represent length in the first direction and the second direction perpendicular to the line segment M from a middle point O of the line segment M to the outer peripheral side surface, respectively.

In one embodiment, the honeycomb structure according to the present invention satisfies a relationship of $1.2 \leq H_1/H_2$.

In another embodiment, the honeycomb structure according to the present invention satisfies a relationship of $H_3 > H_1$, wherein $H_3$ represents an average height of an outer peripheral portion and $H_1$ represents an average height of the entire honeycomb structure, wherein the outer peripheral portion is a region from an outer peripheral side surface toward a central axis having 0 to 5% of length with respect to a length from the outer peripheral side surface to the central axis.

In yet another embodiment of the honeycomb structure according to the present invention, one or more concave portions are formed on one or both of the bottom surfaces of the honeycomb structure.

In yet another embodiment of the honeycomb structure according to the present invention, the honeycomb structure is configured to be plane-symmetric with a cross section orthogonal to the flow path direction of the cells at a height of ½ of the average height $H_1$ of the entire honeycomb structure as a symmetry surface.

In a further embodiment, the honeycomb structure according to the present invention is made of the same material.

In yet another embodiment of the honeycomb structure according to the present invention, each partition wall of the honeycomb structure has a thickness within ±10% of the average thickness of the partition walls.

In yet another embodiment of the honeycomb structured body according to the present invention, the pair of terminal connecting portions is disposed so as to face each other across the central axis of the honeycomb structure.

Advantageous Effects of Invention

According to the present invention, a honeycomb structure having significantly improved heat generation uniformity can be obtained by improving a bottom surface shape of the columnar honeycomb structure without employing a method of joining parts having different volume resistivity. According to an embodiment of the present invention, the heat generation uniformity of the honeycomb structure can be enhanced without sacrificing structural reliability of the joint parts, which would cause a problem when joining the parts having different volume resistivity.

BRIEF DESCRIPTION OF DRAWINGS

FIG. 1-1 shows a schematic perspective view of a honeycomb structure according to one embodiment of the present invention.

FIG. 1-2 shows a schematic bottom view of a honeycomb structure according to one embodiment of the present invention.

DETAILED DESCRIPTION OF THE INVENTION

Embodiments for carrying out the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

<1. Honeycomb Structure>

Figure 11:
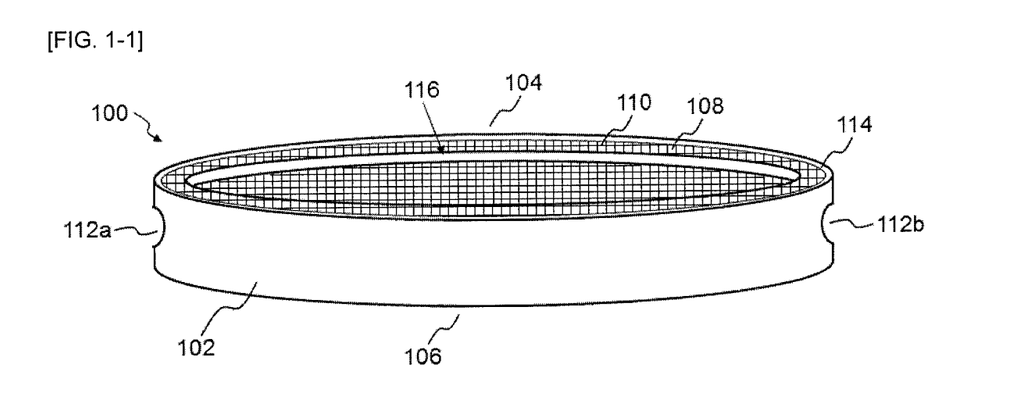
Figure 12:
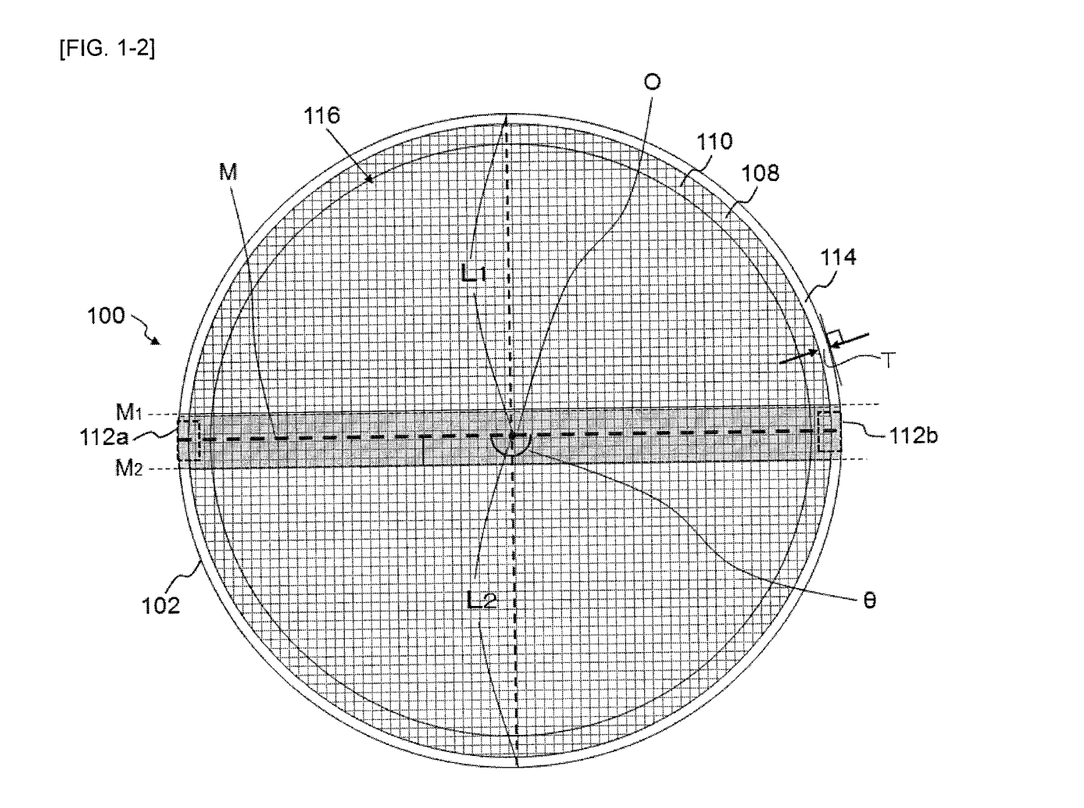

FIG. 1-1 shows a schematic perspective view of a honeycomb structure 100 according to one embodiment of the present invention. Further, FIG. 1-2 shows a schematic bottom view of the honeycomb structure 100 according to one embodiment of the present invention. As shown in FIGS. 1-1 and 1-2, the entire honeycomb structure 100 has a columnar shape, and includes an outer peripheral side wall 114 having an outer peripheral side surface 102; a plurality of partition walls 110 which are disposed inside the outer peripheral side wall 114 and which partition and form a plurality of cells 108 penetrating from a first bottom surface 104 to a second bottom surface 106 to form flow paths; and a pair of terminal connection portions 112a, 112b arranged on the outer peripheral side wall 114.

The honeycomb structure 100 is made of a material having electric conductivity. When terminals are connected to the terminal connecting portions 112a, 112b and a voltage is applied between the terminal connecting portions 112a and 112b, electricity can be supplied for energization to generate heat due to Joule heat. Therefore, the honeycomb structure 100 can be suitably used as a heater. The voltage to be applied may preferably be from 12 to 900 V, and more preferably from 64 to 600 V, but the voltage to be applied may be changed as needed. Further, the honeycomb structure 100 may be used as a catalyst body by supporting a catalyst on the honeycomb structure 100. For example, fluid such as automobile exhaust gas can flow through the flow paths of the plurality of cells 108.

The form of the terminal connecting portions 112a, 112b is not particularly limited as long as they can be connected to the terminals, and in the present embodiment, each of the terminal connecting portions 112a, 112b is drilled on the outer peripheral side surface 104 such that it is easy to insert the terminals to fix them. Each of the terminal connecting portions 112a, 112b may have a female screw shape. In the schematic bottom view of FIG. 1-2, the pair of terminal connecting portions 112a, 112b are hidden and cannot be seen, and so their positions are indicated by dotted lines.

Referring to FIG. 1-2, the pair of terminal connecting portions 112a, 112b may be preferably disposed so as to be opposed to each other across a central axis O of the honeycomb structure 100 when the honeycomb structure 100 is viewed from its bottom, in terms of uniform heating. Specifically, when the honeycomb structure 100 is viewed from its bottom, an angle θ (0°≤θ≤180°) formed by two line segments extending from the respective circumferential centers of the pair of terminal connecting portions 112a, 112b to the central axis O of the honeycomb structure may preferably be 150°≤θ≤180°, and more preferably 160°≤θ≤180°, and even more preferably 170°≤θ≤180°, and most preferably 180°.

When a voltage is applied between the terminal connecting portions 112a and 112b, a heating rate will tend to be higher near a straight line M connecting the circumferential centers of the pair of terminal connecting portions 112a, 112b, and the heating rate will tend to be lower as getting away from the straight line M in the perpendicular direction, because electricity preferentially flows through a path with the lowest resistance. However, the electric resistance near the straight line M can be increased by relatively lowering the height of the honeycomb structure near the straight line M, so that electricity can be more difficult to flow near the straight line M.

Therefore, in one embodiment, the honeycomb structure according to the present invention satisfies a relationship of $H_1 > H_2$ in which:

$H_1$ represents an average height of the entire honeycomb structure; and $H_2$ represents an average height of a portion of the honeycomb structure surrounded by a straight line $M_1$ parallel to a line segment M and located at a distance of $0.1 \times L_1$ from the line segment M forward a first direction and a straight line $M_1$ parallel to the line segment M and located at a distance of $0.1 \times L_2$ from the line segment M toward a second direction, wherein when viewing the honeycomb structure from its bottom, the line segment M represents a line segment connecting circumferential centers of the pair of terminal connection portions and extending from one outer peripheral side surface to other outer peripheral side surface, and $L_1$ and $L_2$ represent lengths in the first direction and the second direction perpendicular to the line segment M from a middle point O of the line segment M to the outer peripheral side surface, respectively. In order to enhance the uniform heating property, a relationship of $1.2 \leq H_1/H_2$ may be preferably satisfied, and a relationship of $1.4 \leq H_1/H_2$ may be more preferably satisfied, and a relationship of $1.6 \leq H_1/H_2$ may be even more preferably satisfied. However, when the ratio $H_1/H_2$ is too high, it will be difficult for electric current to flow near the straight line M on the contrary. Therefore, from the viewpoint of the uniform heating property, a relationship of $H_1/H_2 \leq 3.0$ may be preferably satisfied, and a relationship of $H_1/H_2 \leq 2.5$ may be more preferably satisfied, and a relationship of $H_1/H_2 \leq 2.0$ may be even more preferably satisfied.

The average height $H_1$ of the entire honeycomb structure 100 is determined by the following procedures. First, a volume $V_1$ based on external dimensions of the entire honeycomb structure 100 is calculated. Cells are present in the honeycomb structure 100 and each cell is hollow but it is regarded as solid and not deducted from the volume. A total area $S_1$ when the honeycomb structure is viewed from its bottom is then calculated. Then, it is given by $H_1 = V_1/S_1$.

The average height $H_2$ of the portion of the honeycomb structure surrounded by the straight line $M_1$ and the straight line $M_2$ is determined by the following procedures. First, a volume $V_2$ of the portion of the honeycomb structure surrounded by the straight line $M_1$ and the straight line $M_2$ when the honeycomb structure is viewed from its bottom is calculated based on the external dimensions. As with the $V_1$, the hollow portion of the cell is not deducted from the volume. An area $S_2$ of the portion of the honeycomb structure surrounded by the straight line $M_1$ and the straight line $M_2$ when the honeycomb structure is viewed from its bottom is then calculated. Then, it is given by $H_2 = V_2/S_2$.

The average height $H_1$ of the entire honeycomb structure 100 is not particularly limited and may be set as appropriate according to the application and required performance.

A method of relatively lowering the height of the honeycomb structure near the straight line M includes, but not limited to, a method of forming one or more concave portions in at least a portion(s) corresponding to the straight line M on one bottom surface, preferably both bottom surfaces. The number, depth and shape of the concave portions may be appropriately designed according to the shape of the honeycomb structure. For example, the concave portions may be circular, elliptic, oval, or polygonal (quadrangular, hexagonal, and the like) shaped, or the like, when viewed from the bottom. The inner side surface of the concave portion may be provided in a direction perpendicular to the bottom surface of the honeycomb structure, or the inner side surface of the concave portion may be provided as an inclined surface so that it becomes gradually deep. It is also effective to make the concave portion shallower as getting away from the straight line M in the perpendicular direction or to form one or more concave portion so as to be line-symmetric with the straight line M as an axis of symmetry, in terms of enhancing the uniform heating property.

In the embodiment shown in FIGS. 1-1 and 1-2, one cylindrical concave portion 116 having a circular shape as viewed from the bottom, centered upon the central axis O, is formed on each of the bottom surfaces 104, 106, in the honeycomb structure 100. In terms of enhancing the uniform heating property, the honeycomb structure may be preferably configured to be plane-symmetric with the cross section orthogonal to the flow path direction of the cells 108 at a height of ½ of the average height $H_1$ of the entire honeycomb structure as a symmetry plane.

It is preferable that the vicinity of the outer peripheral side wall of the honeycomb structure is not thin in terms of maintaining the structural strength of the honeycomb structure. Therefore, in one embodiment of the honeycomb structure according to the present invention, a relationship of $H_3 > H_1$ is satisfied, in which equation $H_3$ is an average height of the outer peripheral portion, $H_1$ is an average height of the entire honeycomb structure 100, in which the outer peripheral portion is a region from an outer peripheral side surface 102 toward a central axis O having 0 to 5% of length with respect to a length from the outer peripheral side surface 102 to the central axis O, when the honeycomb structure 100 is viewed from its bottom. It is more preferable that $H_1/H_3 \leq 0.9$, and still more preferably $H_1/H_3 \leq 0.8$. However, if the ratio $H_1/H_3$ is too small, electricity will not flow easily at the center portion. Therefore, a relationship of $0.5 \leq H_1/H_3$ may be preferably satisfied, and a relationship of $0.6 \leq H_1/H_3$ may be more preferably satisfied, and a relationship of $0.7 \leq H_1/H_3$ may be even more preferably satisfied, in terms of the uniform heating property.

The average height $H_3$ of the outer peripheral portion is determined by the following procedures. First, a volume $V_3$ of the outer peripheral portion of the honeycomb structure is calculated based on the outer dimensions. As with the $V_1$, the hollow portion of the cell is not deducted from the volume. An area $S_3$ of the outer peripheral portion is then calculated when the honeycomb structure is viewed from its bottom. Then, it is given by $H_3 = V_3/S_3$.

Each thickness of the partition walls 110 for partitioning and forming the cells 108 may preferably be from 0.1 to 0.3 mm, and more preferably from 0.15 to 0.25 mm. The thickness of the partition walls 110 of 0.1 mm or more will allow suppression of a decrease in the strength of the honeycomb structure. The thickness of the partition walls 110 of 0.3 mm or less will allow suppression of an increase in pressure loss during flowing of exhaust gas when the catalyst is supported using the honeycomb structure 100 as a catalyst carrier. In the present invention, the thickness of the partition walls 110 is defined as a length of a portion passing through the partition walls 110, among the line segments connecting the centers of gravity of adjacent cells 108, in the cross section orthogonal to the flow paths of the cells 108.

From the viewpoint of enhancing the uniform heating property of the honeycomb structure 100, a method of changing the thickness of the partition walls 110 depending on the positions may be additionally adopted. For example, it is considered that electric resistance is increased by reducing the thickness of the partition walls 110 near the straight line M connecting the circumferential centers of the pair of terminal connection portions 112a, 112b when the honeycomb structure 100 is viewed from its bottom. However, the method of changing the thickness of the partition walls 110 depending on the positions would generate an intensity distribution within the honeycomb structure. Therefore, in one embodiment of the honeycomb structure according to the present invention, each of the partition walls 110 of the honeycomb structure 100 has a thickness within ±10% of the average thickness of the partition walls 110, preferably within ±5%.

In the cross section orthogonal to the flow path direction of the cells 108, the honeycomb structure 100 may preferably have a cell density of from 40 to 150 cells/cm$^2$, and more preferably from 70 to 100 cells/cm$^2$. The cell density in such a range will allow the purification performance of the catalyst to be improved in a state where the pressure loss is reduced during flowing of the exhaust gas. If the cell density is lower than 40 cells/cm$^2$, the catalyst supporting area may be reduced. If the cell density is higher than 150 cells/cm$^2$, the pressure loss during flowing the exhaust gas may become large when the catalyst is supported using the honeycomb structure 100 as a catalyst carrier.

Providing the outer peripheral side wall 114 of the honeycomb structure 100 is useful in terms of ensuring the structural strength of the honeycomb structure 100 and preventing the fluid flowing through the cells 108 from leaking out of the outer peripheral side surface 102. More particularly, a thickness T of the outer peripheral side wall 114 may preferably be 0.1 mm or more, and more preferably 0.15 mm or more, and still more preferably 0.2 mm or more. However, if the thickness of the outer peripheral side wall 114 is excessively high, the strength will become too high, so that balance between strengths of the outer peripheral side wall and the partition walls 110 will be lost and a thermal shock resistance will be decreased. Therefore, the thickness T of the outer peripheral side wall 114 may preferably be 1.0 mm or less, and more preferably 0.7 mm or less, and still more preferably 0.5 mm or less. Here, the thickness T of the outer peripheral side wall 114 is defined as a thickness in the normal direction relative to a tangential line of the outer peripheral side wall 114 to be measured, when the location of the outer peripheral side wall 114 to be measured is observed at a cross section orthogonal to the flow path direction of the cells. FIG. 1-2 exemplarily shows the position to measure the thickness T of the outer peripheral side wall 114.

The material for forming the honeycomb structure 100 is not particularly limited as long as the honeycomb structure has conductivity, and metal, ceramics or the like may be used. In particular, the material of the honeycomb structure 100 is preferably based on a silicon-silicon carbide composite material or a silicon carbide, and more preferably may be a silicon-silicon carbide composite material or silicon carbide, in terms of compatibility of heat resistance and electrical conductivity. The phrase "the material of the honeycomb structure 100 is based on a silicon-silicon carbide composite material" as used herein means that the honeycomb structure 100 contains 90% by mass or more of the silicon-silicon carbide composite material with respect to the total mass of the honeycomb structure 100. Here, the silicon-silicon carbide composite material contains silicon carbide particles as an aggregate and silicon as a binder for bonding the silicon carbide particles to each other, and it is preferable that the silicon carbide particles are bonded by silicon such that pores are formed between the silicon carbide particles. Further, the phrase "the material of the honeycomb structure 100 is based on silicon carbide" as used herein means that the honeycomb structure 100 contains 90% by mass or more of the silicon carbide (total mass) with respect to the total mass of the honeycomb structure 100.

When the material of the honeycomb structure 100 is the silicon-silicon carbide composite material, a ratio of the "mass of silicon as a binder" contained in the honeycomb structure 100 to the total of the "mass of the silicon carbide particles as an aggregate" contained in the honeycomb structure 100 and the "mass of silicon as a binder" contained in the honeycomb structure 100 may preferably be from 10 to 40% by mass, and more preferably from 15 to 35% by mass. If it is lower than 10% by mass, the strength of the honeycomb structure may be decreased. If it is higher than 40% by mass, the shape may not be retained during firing.

The honeycomb structure 100 generates heat by Joule heat, and, for example, its electric resistivity is not particularly limited. For example, the electrical resistivity of the honeycomb structure 100 may preferably be from 1 to 200 $\Omega$cm, and more preferably from 10 to 100 $\Omega$cm. Further, the electric resistivity of the honeycomb structure 100 may also be selected in accordance with the application for use in the honeycomb structure 100. In the present invention, the electric resistivity of the honeycomb structure 100 is defined as a value measured at 400° C. by a four-terminal method.

A method of changing the material of the honeycomb structure 100 depending on the positions may be additionally adopted in terms of enhancing uniform heating property of the honeycomb structure 100. For example, it is conceivable to increase the electric resistivity of the material forming the partition walls 110 near the straight line M connecting the circumferential centers of the pair of terminal connection portions 112a, 112b when the honeycomb structure 100 is viewed from its bottom. However, as described above, the method of changing the material of the honeycomb structure 100 depending on the positions is required for joining a plurality of parts, so that the structural strength of the honeycomb structure 100 may be decreased. Therefore, in one embodiment of the honeycomb structure 100 according to the present invention, all the partition walls can be made of the same material. In another embodiment of the honeycomb structure 100 according to the present invention, all the partition walls 110 and the outer peripheral side wall 114 can be made of the same material. In a further embodiment of the honeycomb structure 100 according to the present invention, all the components can be made of the same material. In this case, the honeycomb structure 100 has substantially the same material composition at any position and can be integrally molded.

The partition wall 110 may be porous. The porosity of the partition wall 110 may preferably be from 35 to 60%, and more preferably from 35 to 45%. If the porosity is less than 35%, increased deformation may occur during firing. If the porosity exceeds 60%, the strength of the honeycomb structure may be decreased. The porosity is a value measured by a mercury porosimeter.

The mean pore diameter of the partition walls 110 of the honeycomb structure may preferably be from 2 to 15 μm, and more preferably 4 to 8 μm. If the mean pore diameter is smaller than 2 μm, the electrical resistivity may become too high. If the mean pore diameter is larger than 15 μm, the electrical resistivity may become too small. The mean pore diameter is a value measured by a mercury porosimeter.

The shape of each cell 108 in the cross section orthogonal to the flow path direction of the cells 108 includes, but not limited to, preferably a square, a hexagon, an octagon, or a combination thereof. Among them, square and hexagon shapes may be preferable. Such a cell shape will reduce the pressure loss when the exhaust gas flows through the honeycomb structure 100, thereby resulting in improved purification performance of the catalyst.

The external shape of the honeycomb structure 100 is not particularly limited as long as it is columnar. For example, the external shape of the honeycomb structure 100 may be a columnar shape with circular bottoms (cylindrical shape), a columnar shape with oval bottom shapes, a columnar shape with polygonal bottom shapes (quadrangle, pentagon, hexagon, heptagon and octagon shapes, etc.), or the like. For the size of the honeycomb structure 100, an area of the bottom surface may preferably be from 2000 to 20000 mm$^2$, and more preferably from 5000 to 15000 mm$^2$, for the reason of heat resistance (cracks generated in the outer wall portion in the outer peripheral direction).

<2. Method for Producing Honeycomb Structure>

Next, while a method for producing the honeycomb structure according to the present invention will be exemplarily described, the method of producing the honeycomb structure according to the present invention is not limited to the producing method as described below. In one embodiment, the method for producing the honeycomb structure according to the present invention includes a step of providing a honeycomb formed body and a step of firing the honeycomb formed body.

The honeycomb formed body can be produced in accordance with a method for making a honeycomb formed body in the known method for producing the honeycomb structure. For example, firstly, a molding material is prepared by adding metallic silicon powder (metallic silicon), a binder, a surfactant, a pore former, water and the like to silicon carbide powder (silicon carbide). The mass of metallic silicon may preferably be from 10 to 40% by mass relative to the sum of the mass of silicon carbide powder and the mass of metallic silicon. The mean particle diameter of the silicon carbide particles in the silicon carbide powder may preferably be from 3 to 50 μm, and more preferably from 3 to 40 μm. The mean particle diameter of metallic silicon (metallic silicon powder) may preferably be from 2 to 35 μm. The mean particle diameter of the silicon carbide particles and that of the metallic silicon (metallic silicon particles) refer to an arithmetic mean diameter on volume basis when frequency distribution of the particle size is measured by a laser diffraction method. The silicon carbide particles are fine particles of silicon carbide forming the silicon carbide powder, and the metallic silicon particles are fine particles of metallic silicon forming the metal silicon powder. It should be noted that this is the formulation of the molding material when the material of the honeycomb structure is the silicon-silicon carbide based composite material, and no metallic silicon is added when the material of the honeycomb structure is silicon carbide.

Examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, it is preferable to use methyl cellulose in combination with hydroxypropoxyl cellulose. The content of the binder may preferably be from 2.0 to 10.0 parts by mass when the total mass of the silicon carbide powder and the metallic silicon powder is 100 parts by mass.

The content of water may preferably be from 20 to 60 parts by mass when the total mass of the silicon carbide powder and the metallic silicon powder is 100 parts by mass.

Examples of the surfactant that can be used include ethylene glycol, dextrin, fatty acid soap, polyalcohol and the like. These may be used alone or in combination with two or more. The content of the surfactant may preferably be from 0.1 to 2.0 parts by mass when the total mass of the silicon carbide powder and the metallic silicon powder is 100 parts by mass.

The pore former is not particularly limited as long as it will form pores after firing, and includes, for example, graphite, starches, foaming resins, water absorbing resins, silica gel and the like. The content of the pore former may preferably be from 0.5 to 10.0 parts by mass when the total mass of the silicon carbide powder and the metallic silicon powder is 100 parts by mass. The mean particle diameter of the pore former may preferably be from 10 to 30 μm. If it is smaller than 10 μm, pores may not be formed sufficiently. If it is larger than 30 μm, the die may be clogged with the pore former during molding. The mean particle diameter of the pore former refers to an arithmetic mean diameter on volume basis when the frequency distribution of the particle size is measured by a laser diffraction method. When the pore former is the water absorbing resin, the mean particle diameter of the pore former refers to the mean particle diameter after water absorption.

Subsequently, the resulting molding material is kneaded to form a green body, and the green body is then subjected to extrusion molding to prepare a honeycomb formed body including partition walls and an outer peripheral side wall. In the extrusion molding, a die having a desired overall shape, cell shape, partition wall thickness, cell density and the like can be used. The resulting honeycomb formed body is preferably subjected to drying. Hereinafter, the dried honeycomb formed body may be referred to as a "honeycomb dried body". When the length in the central axis direction of the honeycomb formed body (or the honeycomb dried body) is not a desired length, both the bottom portions of the honeycomb formed body can be cut to the desired length.

On the outer peripheral side surface of the honeycomb formed body thus obtained, the pair of terminal connecting portions can be then formed by a piercing machine or the like. Further, one or both of the bottom surfaces of the honeycomb formed body thus obtained can be processed by cutting work using a lathe, a milling machine or the like to form a desired concave portion(s). The formation of the pair of terminal connecting portions and the processing of the bottom surface(s) may be carried out after firing. However, both the pair of terminal connecting portions and the concave portion(s) may be preferably formed prior to firing, because there is concern about an increase in an amount of waste materials and abrasion of a polishing jig.

The honeycomb formed body is then fired to obtain a honeycomb fired body. Before carrying out the firing, the honeycomb formed body may be dried. Further, before the firing, degreasing may be performed in order to remove the binder and the like in the raw material. The firing may be preferably carried out by heating the honeycomb formed body in an inert atmosphere such as nitrogen or argon at 1400 to 1500° C. for 1 to 20 hours. After the firing, an oxidation treatment may be preferably carried out at 1200 to 1350° C. for 1 to 10 hours in order to improve the durability. The degreasing and firing methods are not particularly limited, and the firing may be carried out using an electric furnace, a gas furnace or the like.

EXAMPLES

Hereinafter, Examples will be illustrated for better understanding of the present invention and its advantages, but the present invention is not limited to the Examples. In FIGS. 2 to 5, the illustration of the cell structure of the honeycomb structure is omitted for simplicity.

Comparative Example 1

(1. Preparation of Columnar Green Body)

A ceramic raw material was prepared by mixing silicon carbide (SiC) powder and metallic silicon (Si) powder at a mass ratio of 80:20. To the ceramic raw material were added hydroxypropylmethyl cellulose as a binder and a water absorbing resin as a pore former, as well as water, to form a molding material. The molding material was then kneaded by a vacuum green body kneader to prepare a columnar green body. The content of the binder was 7 parts by mass with respect to the total amount of silicon carbide (SiC) powder and metallic silicon (Si) powder was 100 parts by mass. The content of the pore former was 3 parts by mass with respect to the total amount of silicon carbide (SiC) powder and metallic silicon (Si) powder was 100 parts by mass. The content of water was 42 parts by mass with respect to the total amount of silicon carbide (SiC) powder and metallic silicon (Si) powder was 100 parts by mass. The mean particle diameter of silicon carbide powder was 20 μm and the mean particle diameter of metallic silicon powder was 6 μm. The mean particle diameter of the pore former was 20 μm. Each of the mean particle diameter of silicon carbide, metallic silicon and pore former refers to an arithmetic mean diameter on volume basis when the frequency distribution of particle size is measured by a laser diffraction method.

(2. Preparation of Honeycomb Dried Body)

The resulting columnar green body was molded using an extruder including a grid-like die to provide a columnar honeycomb formed body including cells each having a square shape in the cross section orthogonal to the flow path direction of the cells. The honeycomb formed body was subjected to high frequency induction heating for drying and then dried at 120° C. for 2 hours by using a hot air drier, and predetermined amounts of both bottom surfaces were cut to prepare a honeycomb dried body.

(3. Formation of Terminal Connection Portion)

Figure 5:
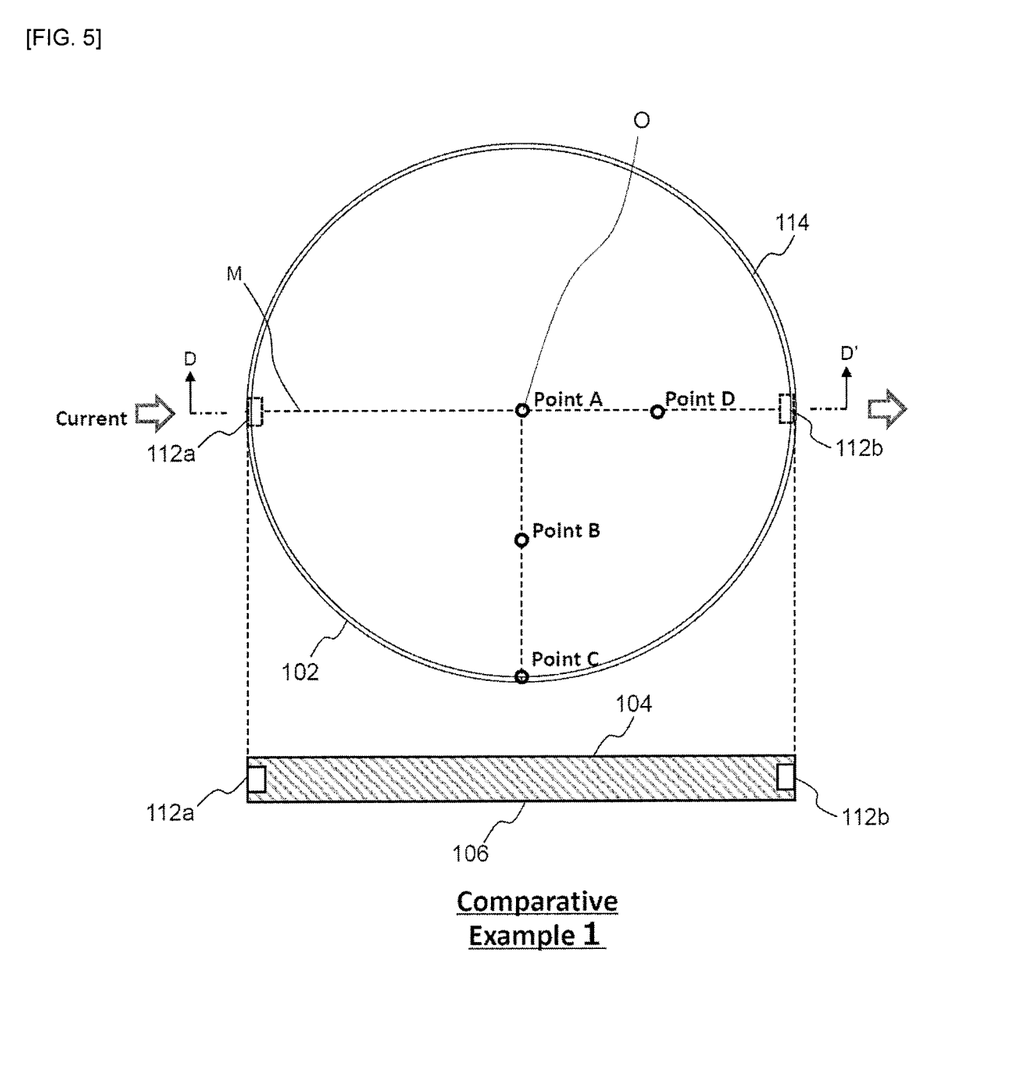
FIG. 5 shows a schematic bottom view (upper view) and a cross-sectional schematic view (lower view) taken along a line D-D' in a honeycomb structure according to Comparative Example 1.

A pair of cylindrical terminal connection portions 112a, 112b was drilled and formed at the opposing central portions in the height direction of the outer peripheral side surface 102 across the central axis O of the honeycomb dried body by a piercing machine, as shown in FIG. 5. It should be noted that in the schematic bottom view of FIG. 5, the pair of terminal connecting portions 112a, 112b is not shown because it is hidden in the inside, and the terminal connecting portions 112a, 112b are therefore represented by dotted lines.

(4. Processing of Bottom Surface)

In Comparative Example 1, the bottom surfaces 104, 106 are not subjected to processing for forming a concave portion.

(5. Firing)

The honeycomb dried body was then degreased, fired and further oxidized to provide a honeycomb structure. The degreasing was carried out in an oxidizing atmosphere at 550° C. for 3 hours. The firing was carried out in an argon atmosphere at 1450° C. for 2 hours. The oxidation treatment was carried out in an oxidizing atmosphere at 1300° C. for 1 hour.

The various dimensions of the resulting honeycomb structure were substantially the same as those of the honeycomb dried body. The honeycomb dried body had each bottom surface with a circular shape having a diameter of 120 mm and a height (a length in the direction of the flow paths of the cells) of 10 mm. The cell density was 62 cells/cm$^2$, the thickness of each partition wall was 0.15 mm, the porosity of the partition walls was 45%, and the mean pore diameter of the partition walls was 8.6 μm. The thickness of the outer peripheral side wall was 0.35 mm at any of measurement points. $H_1$, $H_2$ and $H_3$ of the honeycomb structure are shown in Table 1.

(6. Measurement of Temperature Distribution during Heating)

Temperature variation depending on the positions of the honeycomb structure was investigated for the resulting honeycomb structure when terminals were connected to the pair of terminal connecting portions 112a, 112b and a voltage was applied to both the terminals to supply electric energy (400 W) for 20 seconds. The temperature measurement points were four points A to D as shown in FIG. 5, and the temperature at each measurement point was measured when passing 20 seconds from the start of supply of electric energy. The results are shown in Table 2.

Example 1

(1. Preparation of Columnar Green Body)

A columnar green body was prepared by the same procedures as in Comparative Example 1.

(2. Preparation of Honeycomb Dried Body)

A honeycomb dried body was prepared by the same procedures as in Comparative Example 1.

(3. Formation of Terminal Connection Portion) Terminal connecting portions were formed by the same procedures as in Comparative Example 1.

(4. Processing of Bottom Surface)

Figure 2:
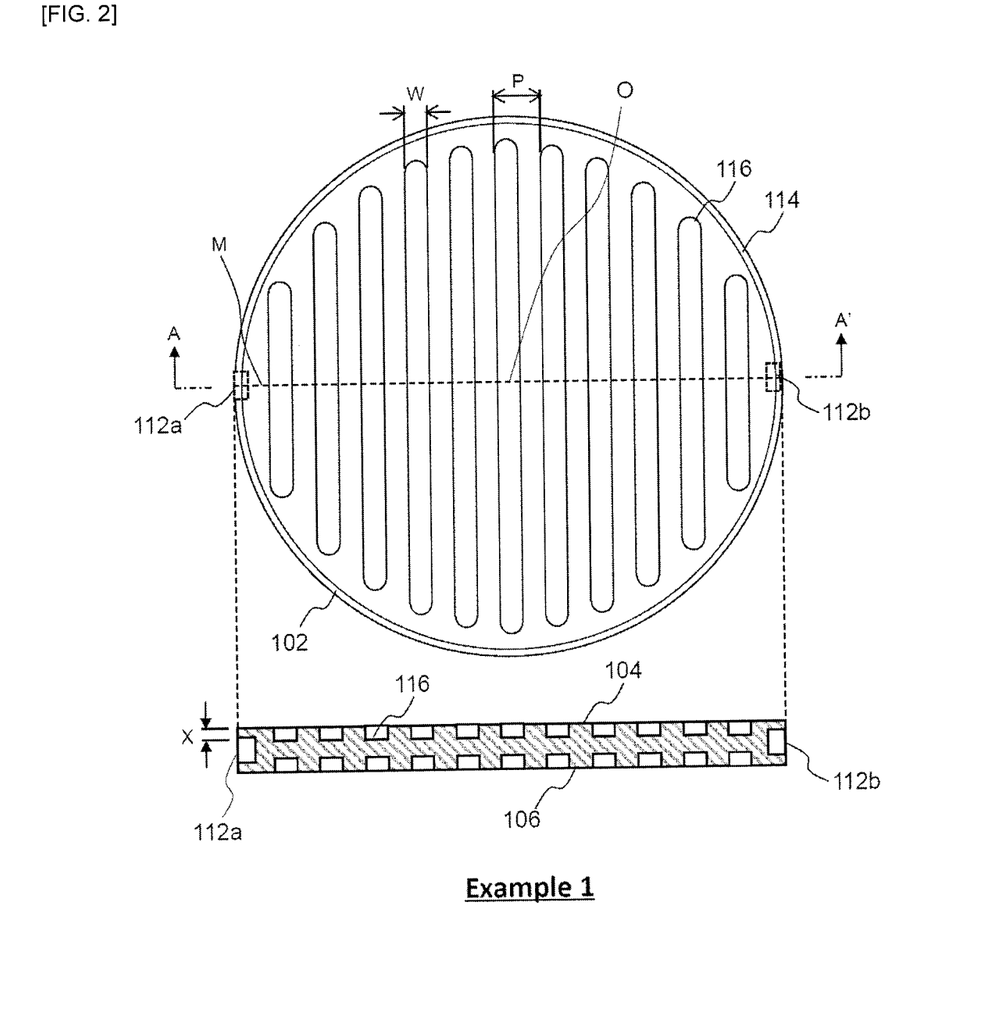
FIG. 2 shows a schematic bottom view (upper view) and a cross-sectional schematic view (lower view) taken along a line A-A' of a honeycomb structure according to Example 1 of the present invention.

According to the arrangement shown in FIG. 2, both bottom surfaces of the honeycomb dried body were subjected to cutting work to form a plurality of oval concave portions 116 which extended in a direction perpendicular to a straight line M connecting circumferential centers of the pair of terminal connecting portions when viewed from the bottom and which was line-symmetric with the straight line M as a symmetry axis. In this case, a depth (X) of each concave portion 116 was 2.5 mm, a pitch (P) of the concave portions 116 in the direction parallel to the straight line M was 10 mm, and a width (W) of each concave portion 116 in the direction parallel to the straight line M was 5 mm. It should be noted that no concave portion 116 was formed on the outer peripheral region having a length of 5 mm from the outer peripheral side surface 102 toward the central axis O of the honeycomb dried body when viewed from the bottom.

(5. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. $H_1$, $H_2$ and $H_3$ of the honeycomb structure are shown in Table 1. It should be noted that the honeycomb structure after processing the bottom surfaces was configured to be plane-symmetric with the cross section orthogonal to the flow path direction of the cells at a height of ½ of the average height $H_1$ of the entire honeycomb structure as a symmetry plane.

(6. Measurement of Temperature Distribution During Heating)

For the resulting honeycomb structure, the temperature distribution during heating was measured in the same method as in Comparative Example 1. The results are shown in Table 2.

Example 2

(1. Preparation of Columnar Green Body)

A columnar green body was prepared by the same procedures as in Comparative Example 1.

(2. Preparation of Honeycomb Dried Body)

A honeycomb dried body was prepared by the same procedures as in Comparative Example 1.

(3. Formation of Terminal Connection Portion)

Terminal connecting portions were formed by the same procedures as in Comparative Example 1.

(4. Processing of Bottom Surface)

Figure 3:
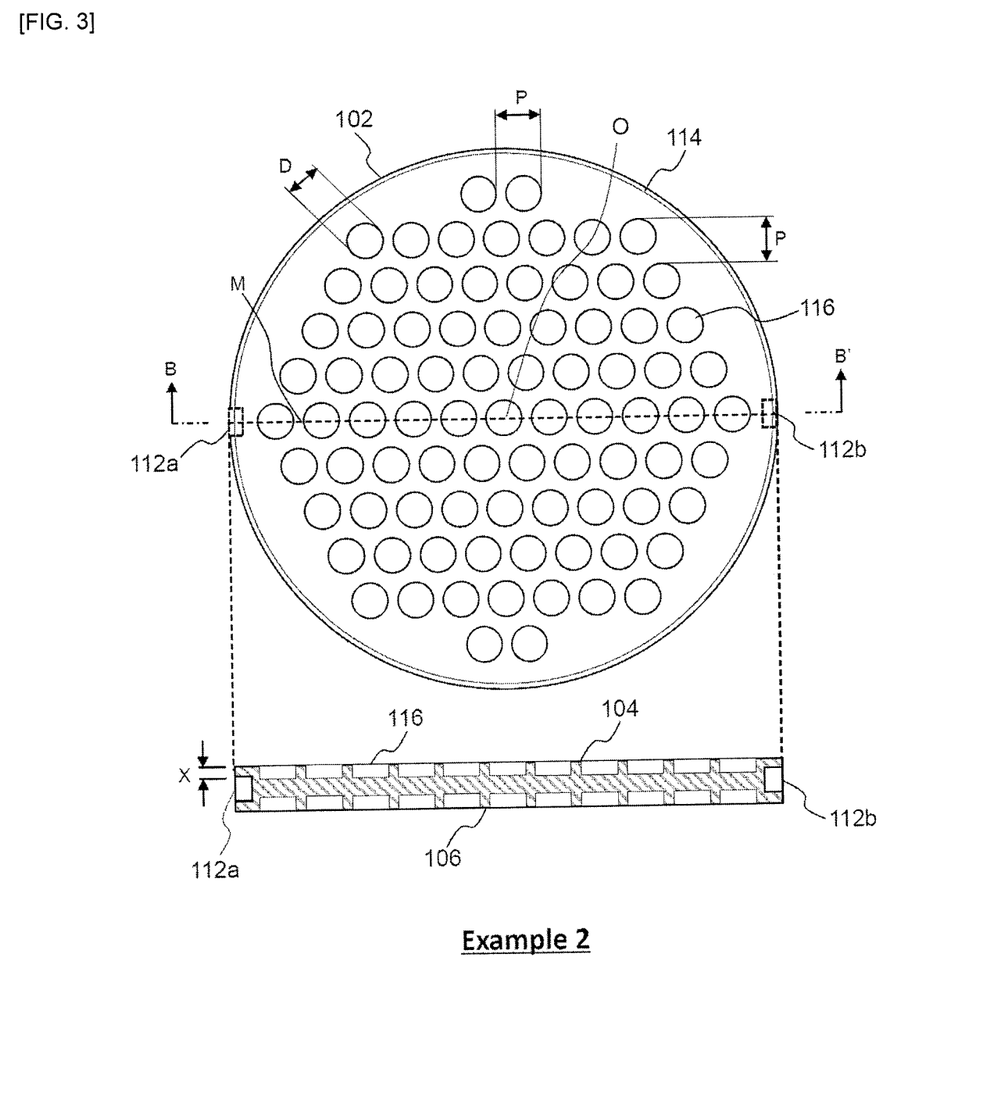
FIG. 3 shows a schematic bottom view (upper view) and a cross-sectional schematic view (lower view) taken along a line B-B' of a honeycomb structure according to Example 2 of the present invention.

According to the arrangement shown in FIG. 3, both bottom surfaces of the honeycomb dried body were subjected to cutting work to form a plurality of cylindrical concave portions each having a circle shape (diameter D=8 mm) when viewed from the bottom, which were line-symmetric with the straight line M as a symmetry axis. In this case, a depth (X) of each concave portion 116 was 2.5 mm, and pitches (P) of the concave portions 116 in the directions parallel to and perpendicular to the straight line M were 10 mm, respectively. It should be noted that no concave portion 116 was formed on the outer peripheral region having a length of 5 mm from the outer peripheral side surface 102 toward the central axis O of the honeycomb dried body when viewed from the bottom.

(5. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. $H_1$, $H_2$ and $H_3$ of the honeycomb structure are shown in Table 1. The honeycomb structure after processing the bottom surfaces was configured to be plane-symmetric with the cross section orthogonal to the flow path direction of the cells at a height of ½ of the average height $H_1$ of the entire honeycomb structure as a symmetry plane.

(6. Measurement of Temperature Distribution During Heating)

For the resulting honeycomb structure, the temperature distribution during heating was measured in the same method as in Comparative Example 1. The results are shown in Table 2.

Example 3

(1. Preparation of Columnar Green Body)

A columnar green body was prepared by the same procedures as in Comparative Example 1.

(2. Preparation of Honeycomb Dried Body)

A honeycomb dried body was prepared by the same procedures as in Comparative Example 1.

(3. Formation of Terminal Connection Portion)

Terminal connecting portions were formed by the same procedures as in Comparative Example 1.

(4. Processing of Bottom Surface)

Figure 4:
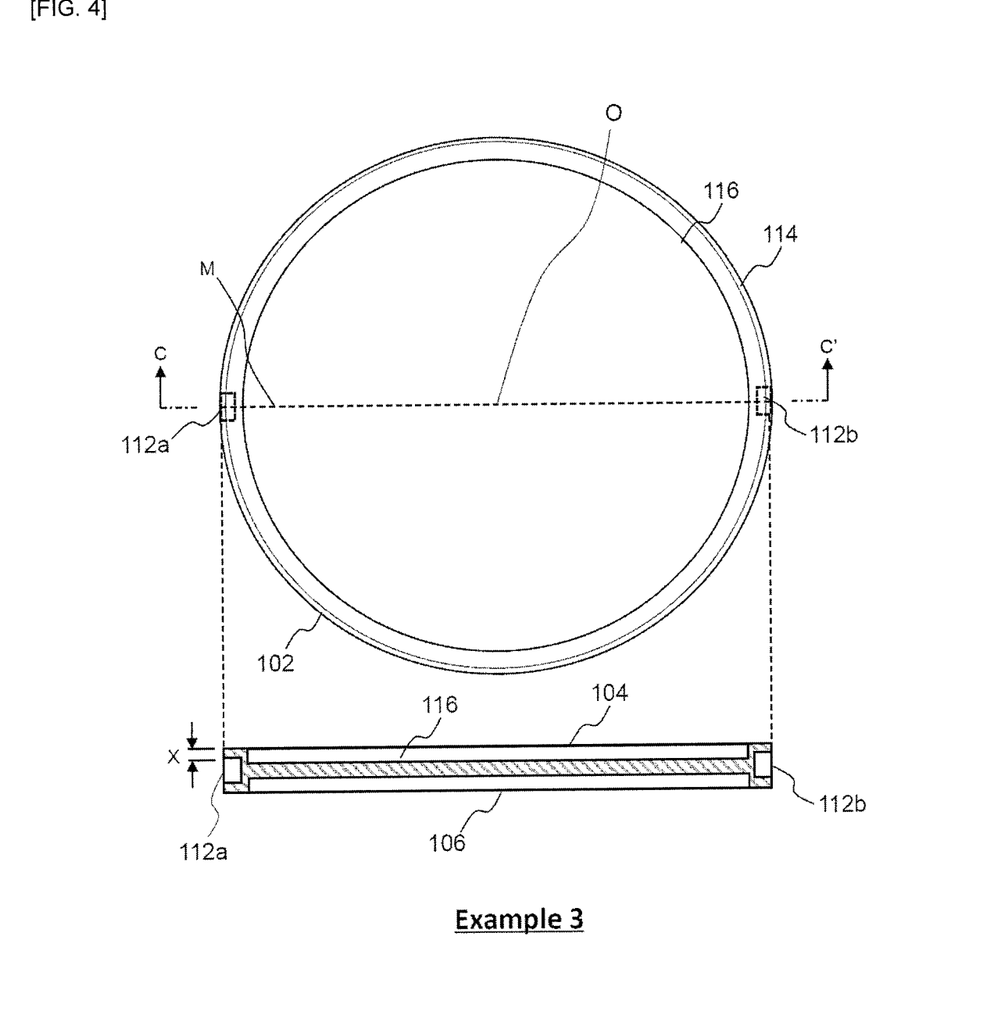
FIG. 4 shows a schematic bottom view (upper view) and a cross-sectional schematic view (lower view) taken along a line C-C' of a honeycomb structure according to Example 3 of the present invention.

According to the arrangement shown in FIG. 4, both bottom surfaces of the honeycomb dried body were subjected to cutting work to form one cylindrical concave portion 116 in the form of a circle (radius R=50 mm) as viewed from the bottom, centered at the central axis O of the honeycomb dried body, on each of the bottom surfaces 104, 106. In this case, a depth (X) of each concave portion 116 was 2.5 mm.

(5. Firing)

The honeycomb dried body was degreased, fired and further oxidized to provide a honeycomb structure by the same procedures as in Comparative Example 1.

The various dimensions of the resulting honeycomb structure were substantially the same as those of the honeycomb dried body. $H_1$, $H_2$ and $H_3$ of the honeycomb structure are shown in Table 1. The honeycomb structure after processing the bottom surfaces was configured to be plane-symmetric with the cross section orthogonal to the flow path direction of the cells at a height of ½ of the average height $H_1$ of the entire honeycomb structure as a symmetry plane.

(6. Measurement of Temperature Distribution During Heating)

For the resulting honeycomb structure, the temperature distribution during heating was measured in the same method as in Comparative Example 1. The results are shown in Table 2.

TABLE 1

| | Overall Average Height $H_1$ (mm) | Average Height of Centeral Cross Section $H_2$ (mm) | Average Height of Outer Peripheral Portion $H_3$ (mm) | $H_1/H_2$ | $H_1/H_3$ |
|---|---|---|---|---|---|
| Comparative Example 1 | 10 | 10 | 10 | 1.00 | 1.00 |
| Example 1 | 9.89 | 7.71 | 10 | 1.28 | 0.99 |
| Example 2 | 8.16 | 8.08 | 10 | 1.01 | 0.82 |
| Example 3 | 6.53 | 5.42 | 10 | 1.21 | 0.65 |

TABLE 2

| | Comparative Example 1 | Example 1 | Example 2 | Example 3 |
|---|---|---|---|---|
| Point A (° C.) | 359 | 351 | 355 | 353 |
| Point B (° C.) | 336 | 349 | 345 | 347 |
| Point C (° C.) | 311 | 344 | 339 | 343 |
| Point D (° C.) | 365 | 350 | 348 | 347 |
| Point A-Point C (° C.) | Δ 48 | Δ 7 | Δ 16 | Δ 10 |

<Discussion>

In both of Examples and Comparative Example, the heating rate was higher near the straight line M connecting the circumferential centers of the pair of terminal connecting portions, and the heating rate was slower as getting away from the straight line M in the perpendicular direction. However, in Examples 1 to 3, the temperature difference between Point A and Point C was smaller than that in Comparative Example 1 and the uniform heating property was improved, because the relationship of $H_1 > H_2$ was established. In particular, Example 1 in which $H_1/H_2$ was controlled to the suitable value exhibited the highest uniform heating property.

DESCRIPTION OF REFERENCE NUMERALS 100 honeycomb structure
102 outer peripheral side surface 104 first bottom surface
106 second bottom surface
108 cell
110 partition wall
112a, 112b terminal connection portion
114 outer peripheral side wall
116 concave portion

What is claimed is:

1. A columnar honeycomb structure comprising an outer peripheral side wall having an outer peripheral side surface; a plurality of partition walls that partition and form a plurality of cells penetrating from one bottom surface to another bottom surface to form flow paths, the plurality of partition walls being disposed inside the outer peripheral side wall; and a pair of terminal connection portions arranged on the outer peripheral side wall, wherein the honeycomb structure satisfies a relationship of $H_1 > H_2$ in which:

$H_1$ represents an average height of the entire honeycomb structure; and $H_2$ represents an average height of a portion of the honeycomb structure surrounded by a straight line $M_1$ parallel to a line segment M and located at a distance of $0.1 \times L_1$ from the line segment M toward a first direction and a straight line $M_2$ parallel to the line segment M and located at a distance of $0.1 \times L_2$ from the line segment M toward a second direction, wherein when viewing the honeycomb structure from at least one of the bottom surfaces of the one bottom surface and the other bottom surface, the line segment M represents a line segment connecting circumferential centers of the pair of terminal connection portions and extending from one outer peripheral side surface to an opposite outer peripheral side surface, and $L_1$ and $L_2$ represent lengths in the first direction and the second direction perpendicular to the line segment M from a middle point O of the line segment M to the outer peripheral side surface, respectively, and wherein two or more concave portions are formed on at least one of the bottom surfaces of the one bottom surface and the other bottom surface.

2. The honeycomb structure according to claim 1, wherein the honeycomb structure satisfies a relationship of $1.2 \leq H_1/H_2$.

3. The honeycomb structure according to claim 1, wherein the honeycomb structure satisfies a relationship of $H_3 > H_1$, wherein $H_3$ represents an average height of an outer peripheral portion and $H_1$ represents the average height of the entire honeycomb structure, wherein the outer peripheral portion is a region from the outer peripheral side surface toward a central axis having 0 to 5% of length with respect to a length from the outer peripheral side surface to the central axis.

4. The honeycomb structure according to claim 1, wherein the honeycomb structure is plane-symmetric with a cross section orthogonal to a flow path direction of the cells at a height of ½ of the average height $H_1$ of the entire honeycomb structure as a symmetry surface.

5. The honeycomb structure according to claim 1, wherein the outer peripheral side wall and the partition walls of the honeycomb structure are made of the same material.

6. The honeycomb structure according to claim 1, wherein each partition wall of the honeycomb structure has a thickness within ±10% of the average thickness of the partition walls.

7. The honeycomb structure according to claim 1, wherein the pair of terminal connecting portions is disposed so as to face each other across a central axis of the honeycomb structure.

* * * * *